Patented Nov. 9, 1948

2,453,167

UNITED STATES PATENT OFFICE 2,453,167

COPOLYMERS OF DIALKENYL ARYLPHOSPHONATES WITH VINYL ACETATE

Arthur Dock Fon Toy, Chicago, Ill., assignor to Victor Chemical Works, a corporation of Illinois No Drawing. Application December 29, 1945, Serial No. 638,456

18 Claims. (Cl. 154—43)

This invention relates to the formation of copolymers of at least one dialkenyl arylphosphonate with vinyl acetate.

In my copending application, Serial No. 625,459, filed October 29, 1945, now U. S. Patent No. 2,425,765, a process is described for the production of monomeric beta, gamma unsaturated dialkenyl arylphosphonate esters. It has now been found that the product so prepared may be copolymerized with vinyl acetate under controlled polymerizing conditions to provide a variety of copolymer compositions of commercial utility.

The physical properties of the polymeric compositions may be varied by controlling the proportions of the monomeric starting esters, by varying the amount of polymerization catalyst employed, and by varying the polymerization time and temperature conditions.

In general the copolymers herein described are produced by mixing the liquid monomeric esters in the desired proportions and dissolving therein a small amount of catalyst and heating the mixture at a temperature generally just below that at which the most volatile of monomeric esters would boil off. Higher temperatures may be employed after the mass is partially polymerized or in case the polymerization reaction is carried out under pressure. The period of heating will depend upon the amount of catalyst employed and the degree of polymerization desired. For example, if the polymers are to be employed for impregnating fibrous materials in the production of laminated products, it is often desirable to arrest the polymerization while the polymers are in a viscous liquid state. In this partially polymerized state the resins may be advantageously applied with or without additional amounts of catalysts, and the polymerization to solid resins completed by further heating.

Organic peroxides such as acetyl peroxide, benzoyl peroxide, etc., are suitable catalysts for promoting the polymerization, and are generally employed in amounts ranging from 0.1% to about 5% by weight of the monomeric ester starting materials.

The monomeric beta, gamma unsaturated dialkenyl arylphosphonate esters may be prepared in accordance with the process of the said Toy application Serial No. 625,459, filed October 29, 1945, which process comprises reacting beta, gamma unsaturated alcohols with arylphosphorus oxydichlorides in the presence of pyridine and separating the dialkenyl ester from the reaction mass. The resulting esters are liquid products which exhibit little or no tendency to polymerize except when mixed with a polymerization catalyst. Polymers of these esters are described in my co-pending application Serial No. 633,272, filed December 6, 1945 and require more severe polymerizing conditions than are required in forming the copolymers of the present invention. Further, the copolymers of the present invention are lighter colored, stronger, and cheaper to produce.

The copolymers of the present invention when fully polymerized are hard, tough, clear, substantially colorless solids which are infusible and resistant to heat, dilute acids and alkalies. They are insoluble in organic liquids such as benzene, carbon tetrachloride, ether, acetone, alcohol, naphtha, gasoline, etc. They may be cast into various shapes by pouring the catalyzed monomeric mixed esters or partially polymerized viscous liquids into suitable molds and heating to complete the polymerization. The solid resins may be ground and polished without difficulty.

The following table illustrates a number of examples where the copolymers were produced by heating various mixtures of the monomeric esters with different amounts of polymerization catalysts under different time and temperature conditions.

| | Dialkenyl Arylphosphonate, per cent by volume | Vinyl Acetate, per cent by volume | Benzoyl Peroxide Catalyst, Grs. per 10 cc. of Monomer | Polymerization Temperature, °C. | Period of Heating, Hours | Properties of Resin Products |
|---|---|---|---|---|---|---|
| | 0 | 100 | 0.01 | 70-73 | 15.5 | Soft and rubbery solid. |
| | 10 | 90 | 0.01 | 70-73 | 31 | Artgum-like solid. |
| | | | | | 49 | Fairly hard and strong solid. |
| | 30 | 70 | 0.01 | 70-73 | 15.5 | Very soft gel. |
| | | | | | 33.5 | Soft gel. |
| | 50 | 50 | 0.01 | 70-73 | 15.5 | Viscous liquid. |
| | | | | | 33.5 | Very soft gel. |
| | | | | 70-73 | 19 | Soft gel. |
| | 50 | 50 | 0.05 | 70-73 | 38 | Artgum-like solid. |
| | | | | 80 | +42 add. | Strong, hard solid, water-white. |
| | 50 | 50 | 0.10 | 70-73 | 15.5 | Hard artgum-like, water-white solid. |
| | 50 | 50 | 0.20 | 70-73 | 24 | Very hard, strong, water-white, flame resistant solid. |
| | 50 | 50 | 0.30 | 70 | 16 | |
| | 50 | 50 | 0.40 | 70 | 16 | Slightly yellow, hard, strong solid. |
| | 50 | 50 | 0.50 | 70 | 16 | Resin cracked. |
| | 0 | 100 | 0.20 | 60 | ½ | Decomposed. |
| Diallyl Phenylphosphonate. | 10 | 90 | 0.20 | 60 | 18 | Strong, slightly soft, nonfusible, flame resistant solid. |
| | 30 | 70 | 0.20 | 60 | 16 | Water-white, artgum-like solid. |
| | | | | | 40 | Strong, fairly hard solid. |
| | 50 | 50 | 0.20 | 60 | 16 | Soft gel. |
| | | | | | 40 | Fairly hard, strong, water-white solid. |
| | 70 | 30 | 0.20 | 80 | 19 | Yellowish, hard, strong solid. |
| | 90 | 10 | 0.20 | 70 | 24 | Water-white, artgum-like solid. |
| | 90 | 10 | 0.20 | 80 | 19 | Slightly yellow, clear, hard, strong solid. |
| | 100 | 0 | 0.20 | 80 | 19 | Slightly yellow, strong, hard solid. |
| | 70 | 30 | 0.30 | 80 | 19 | Yellow, hard, strong solid. |
| | 90 | 10 | 0.30 | 80 | 19 | Do. |
| | 30 | 70 | 0.10 | 60 | 16 | Soft gel. |
| | | | | | 40 | Hard, strong, water-white solid. |
| | 70 | 30 | 0.30 | 70 | 16 | Water-white artgum-like solid. |
| | | | | | 39 | Slightly yellow, clear, hard, strong solid. |
| | 70 | 30 | 0.50 | 70 | 16 | Slightly yellow, hard, strong solid. |
| Dimethallyl Phenylphosphonate. | 50 | 50 | 0.20 | 67-70 | 16½ | Do. |
| Diallyl Tolylphosphonate. | 30 | 70 | 0.1 | 67-70 | 16½ | Slightly soft, water-white, strong solid. |
| | 50 | 50 | 0.2 | 67-70 | 16½ | Slightly yellow, slightly soft solid. |
| Dimethallyl Tolylphosphonate. | 30 | 70 | 0.10 | 67-70 | 16½ | Artgum-like, water-white solid. Surface hard and strong. |
| | 50 | 50 | 0.20 | 67-70 | 16½ | Water-white, very hard and strong solid. |
| Diallyl Chlorophenylphosphonate. | 30 | 70 | 0.10 | 67-70 | 16½ | Slightly yellow, strong solid. Slightly soft surface. |
| | 50 | 50 | 0.20 | 67-70 | 16½ | Clear, yellow, strong, hard solid. |

From the above examples it can be seen that by selecting suitable amounts of catalysts and reacting conditions satisfactory, strong, hard solid resins can be obtained with substantially all proportions of monomeric starting materials ranging from 90% to 10% vinyl acetate and 10% to 90% of the dialkenyl arylphosphonate. However, from the standpoint of producing the most desirable type resins, it is preferred to employ proportions ranging from 70% to 30% vinyl acetate and 30% to 70% dialkenyl arylphosphonate, and from 0.1 to 0.3 grams of benzoyl peroxide per 10 cc. of the monomeric starting materials. Temperatures of 60° to 80° C. are shown to be satisfactory.

Examples in the above table using vinyl acetate alone produced unsatisfactory resins. As little as 1% of diallyl phenylphosphonate copolymerized with 99% of vinyl acetate will yield a solid resin product but for practical purposes a more satisfactory solid resin is obtained when at least 10% of the diallyl phenylphosphonate is employed. Such resins show improved flame resistance in proportion to the phosphonate component. A resin obtained from 70 parts vinyl acetate and 30 parts of the beta, gamma unsaturated dialkenyl arylphosphonate will burn in an applied flame but will extinguish itself after the external flame is withdrawn.

Laminated sheets of fiber glass and fabrics are prepared by impregnating the fibrous materials with liquid mixtures of beta, gamma unsaturated dialkenyl arylphosphonates and vinyl acetate, containing from 1 to 3% benzoyl peroxide, pressing the impregnated layers together, and heating the mass in the compressed state at a temperature of 60 to 100° C. for a sufficient time to cause the impregnating liquids to polymerize, forming a strong, solid laminated sheet having a resin content of 30 to 60% by weight. The amount of resin in the laminate may be varied by varying the viscosity of the original impregnating liquids from that of the monomeric mixtures to the partially polymerized viscous liquid products.

The foregoing detailed description has been given for clearness of understanding only, and no unnecessary limitations should be understood therefrom.

What I claim as new and desire to secure by Letters Patent is:

1. A copolymer of 10 to 99% by volume of vinyl acetate and 90 to 1% of a member of the class consisting of diallyl and dimethallyl arylphosphonates.

2. The copolymer of claim 1 wherein the member of said class is a diallyl arylphosphonate.

3. The copolymer of claim 1 wherein the member of said class is a dimethallyl arylphosphonate.

4. The copolymer of claim 1 wherein the member of said class is diallyl phenylphosphonate.

5. The copolymer of claim 1 wherein the member of said class is diallyl chlorophenylphosphonate.

6. The copolymer of claim 1 wherein the member of said class is dimethallyl phenylphosphonate.

7. The copolymer of claim 1 wherein the amount of vinyl acetate is from 30 to 70% and the amount of the arylphosphonate is from 70 to 30%.

8. The method of making a resin which comprises mixing from 10 to 99% by volume of vinyl acetate and from 90 to 1% of a member of the class consisting of diallyl and dimethallyl arylphosphonate, and heating at a temperature of from 60° C. to a temperature just below the temperature at which decomposition or distillation of the reactants and the resin products occurs, said reactants being heated in the presence of from 0.1 to 5.0% by weight of the starting esters of an organic peroxide catalyst.

9. The method of claim 8 wherein the member of said class is a diallyl arylphosphonate.

10. The method of claim 8 wherein the member of said class is a dimethallyl arylphosphonate.

11. The method of claim 8 wherein the member of said class is diallyl phenylphosphonate.

12. The method of claim 8 wherein the member of said class is a dimethallyl phenylphosphonate.

13. The method of claim 9 wherein said catalyst is benzoyl peroxide.

14. The method of claim 9 wherein the temperature is between 60° and 100° C.

15. The method of claim 9 wherein the temperature is between 60° and 80° C.

16. A composition of matter comprising a laminated fibrous material impregnated with a copolymer of 10 to 99% by volume of vinyl acetate and 90 to 1% of a member of the class consisting of diallyl and dimethallyl arylphosphonates.

17. The composition of claim 16 wherein the fibrous material comprises fiber glass.

18. The composition of claim 16 wherein the fibrous material comprises textile fibers.

ARTHUR DOCK FON TOY.

REFERENCES CITED

The following references are of record in the file of this patent:

UNITED STATES PATENTS

| Number | Name | Date |
| --- | --- | --- |
| 2,389,576 | Kosolapoff | Nov. 20, 1945 |